(12) United States Patent
Dunn et al.

(10) Patent No.: US 6,429,957 B1
(45) Date of Patent: Aug. 6, 2002

(54) DOUBLE-PASS SAGITTALLY OFFSET PRE-POLYGON OPTICS FOR RASTER OUTPUT SCANNERS

(75) Inventors: Susan E. Dunn, Penfield; James J. Appel, Brighton; John A. Durbin, Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/534,530

(22) Filed: Mar. 27, 2000

(51) Int. Cl.[7] .............................................. G02B 26/08
(52) U.S. Cl. ........................................ 359/216; 359/205
(58) Field of Search ................................ 359/205–207, 359/216–219, 212, 15, 588, 566, 710, 711

(56) References Cited

U.S. PATENT DOCUMENTS 4,932,734 A * 6/1990 Sakuma et al. ............. 359/207
6,104,523 A * 8/2000 Ang ........................... 359/216

* cited by examiner

Primary Examiner—James Phan
(74) Attorney, Agent, or Firm—Oliff & Berridge, PLC

(57) ABSTRACT

Pre-polygon optics are provided which consist of a compact design such that the number of pre-polygon elements in the pre-polygon optics is reduced while achieving desired light beam characteristic. The pre-polygon optics may consist of a hybrid toroidal diffractive optical element, refractive cross-cylindrical optical elements, refractive spherical and cylindrical optical elements, a refractive sagittal cylindrical optical element or a refractive tangential cylindrical optical element. Accordingly, advantages such as lower cost and ease of alignment are achieved.

20 Claims, 7 Drawing Sheets

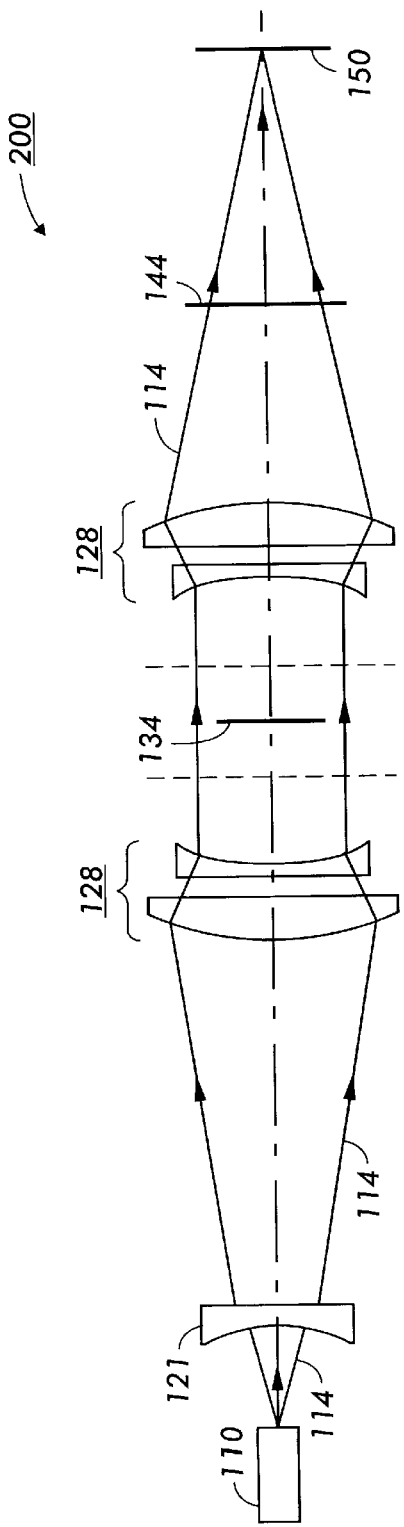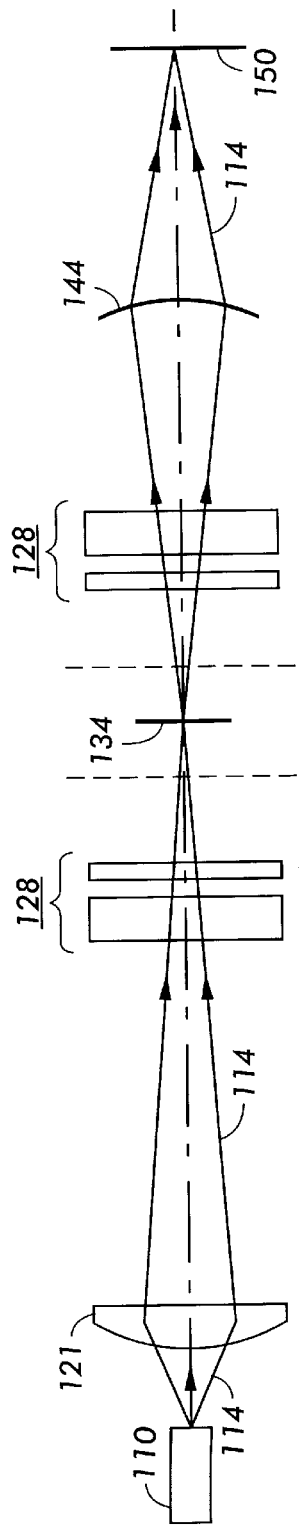
FIG. 2A
FIG. 2B

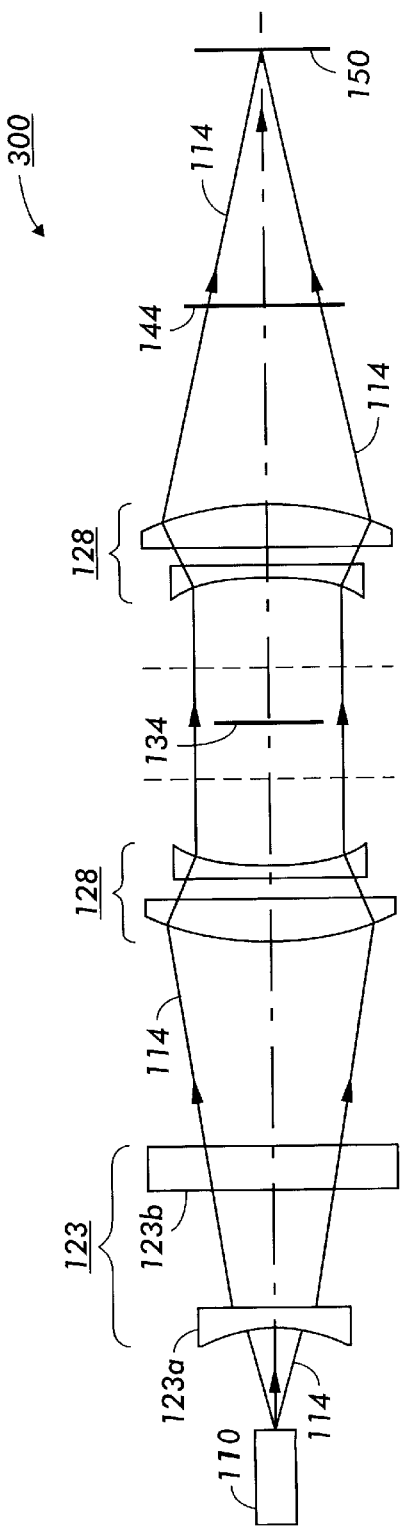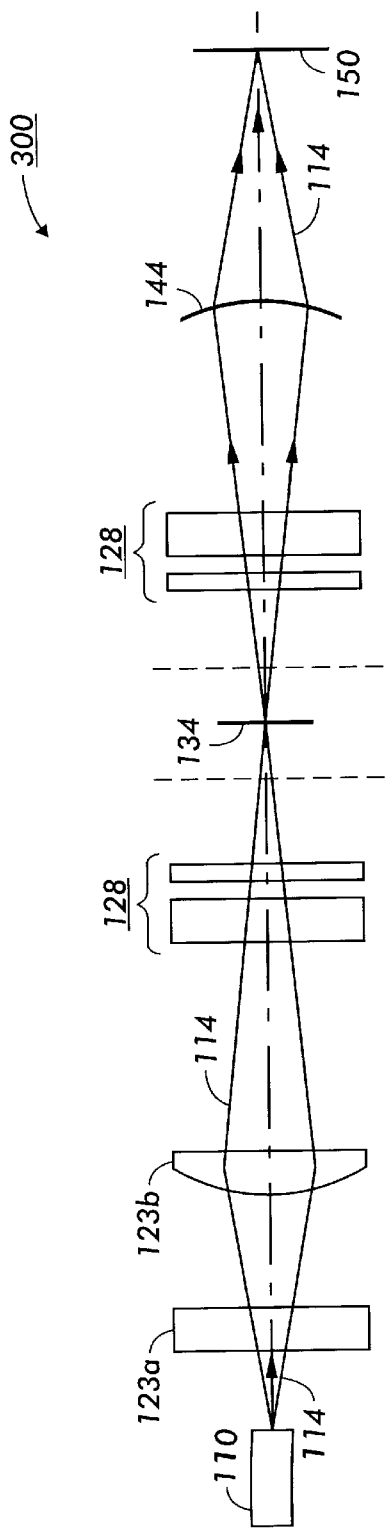

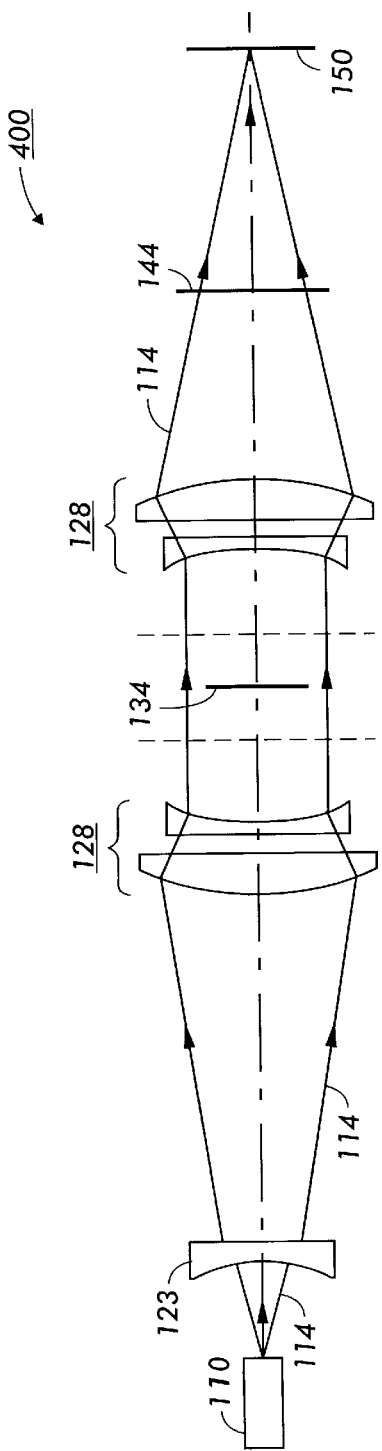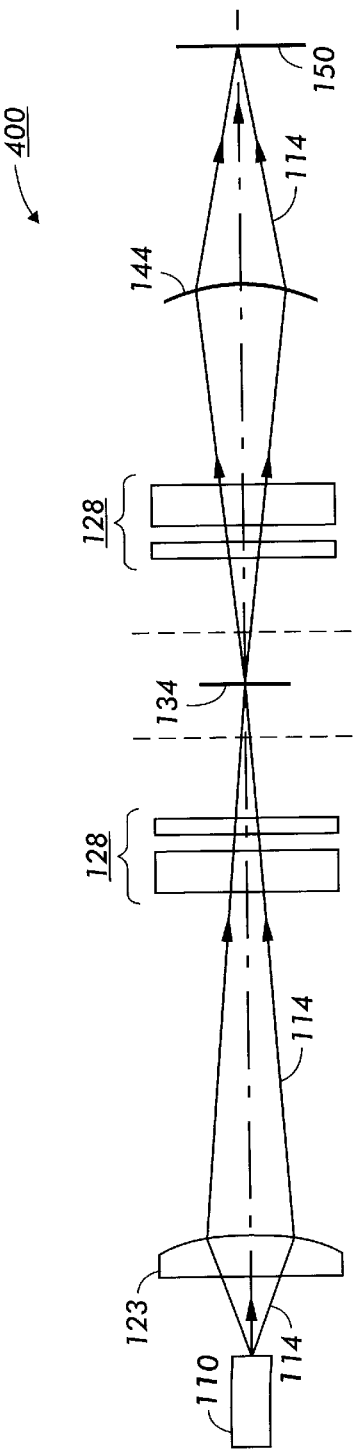
FIG. 4A
FIG. 4B

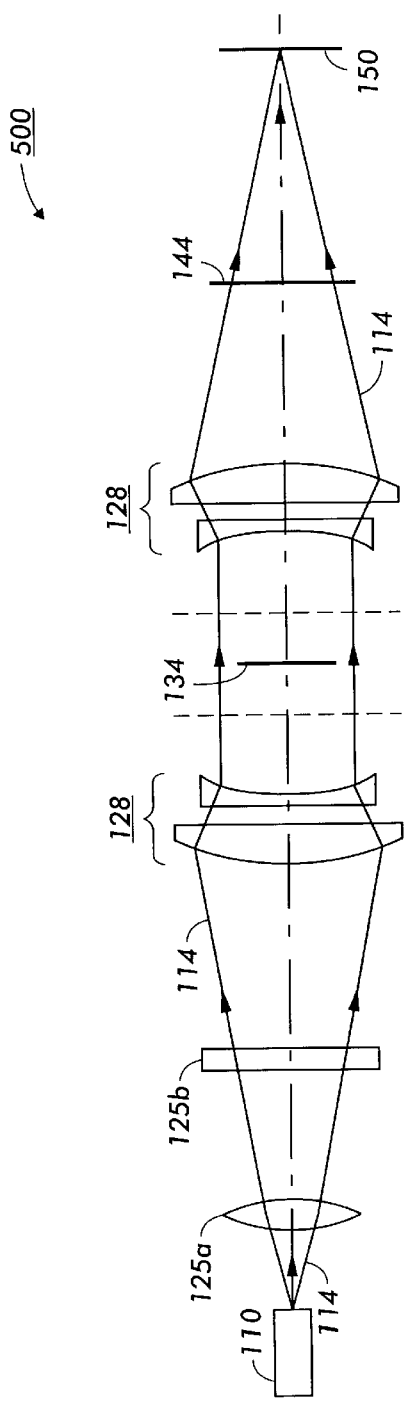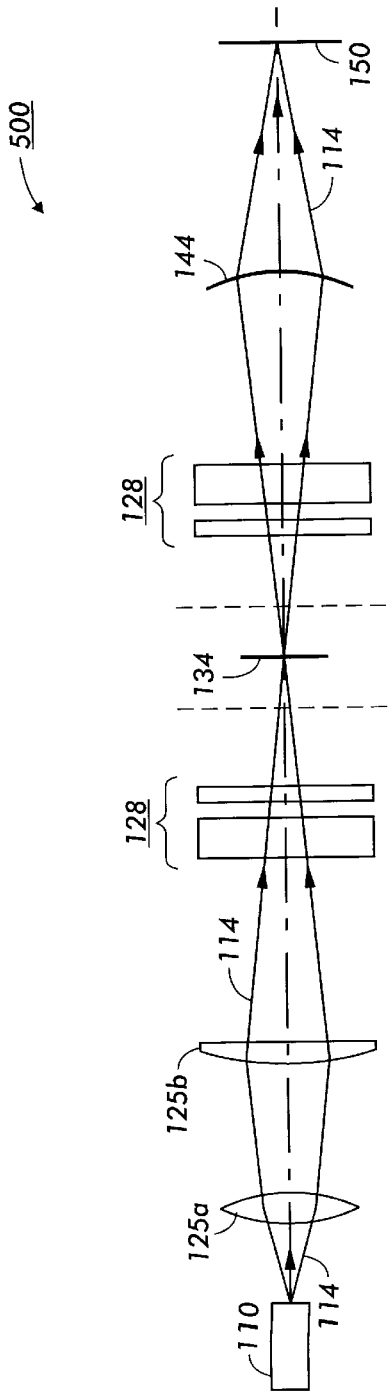

DOUBLE-PASS SAGITTALLY OFFSET PRE-POLYGON OPTICS FOR RASTER OUTPUT SCANNERS

BACKGROUND OF THE INVENTION

1. Field of Invention

This invention is directed towards raster output scanners that include double-pass sagittally offset pre-polygon optics.

2. Description of the Related Art

Electrophotography, a method of copying or printing documents, is performed by exposing a light image representation of a desired original image onto a substantially uniformly charged image carrying member. Imaging systems obtain read information based on original image data and image light beams onto the image carrying member representing the original image data.

An imaging system assembly may include a light source, pre-polygon optics, a scanning device including a polygon mirror, and post-polygon optics. The light source emits at least one light beam which passes first through the pre-polygon optics. The pre-polygon optics collimates the light beam in the fast scan direction and converges the light in the cross scan direction to a line focus on a polygon facet of the rotating polygon mirror. The rotating polygon mirror in the scanning device rotates around an axis of rotation, while the active facet of the polygon mirror reflects the light beam to the post-polygon optics. As the current facet scans the beam in the scan direction, an image carrying member is moving in a process direction which is perpendicular to the scan direction. Each light beam reflected from the current facet of the rotating polygon mirror passes through the post-polygon optics and is imaged onto the image carrying member to form an image.

SUMMARY OF THE INVENTION

In various embodiments of imaging systems, a double-pass optical system may be applied. In a double-pass optical system, the pre-polygon optics and the post-polygon optics are provided by a single set of optical elements. Accordingly, the light beam propagates through one or more double-pass optical elements of the pre-polygon optics, including pre-polygon scan lenses, before reaching a facet of the polygon mirror, and then propagates back through those one or more double-pass optical elements of the post-polygon optics before reaching the image carrying member.

This invention provides a double-pass optical system that reduces the number of double-pass optical elements.

In various exemplary embodiments of the double-pass optical system of this invention, the double-pass optical elements include a hybrid toroidal diffractive optical element.

In various other exemplary embodiments of the double-pass optical system of this invention, the double-pass optical elements include refractive cross-cylindrical optical elements.

In various other exemplary embodiments of the double-pass optical system of this invention, the double-pass optical elements include refractive spherical and cylindrical optical elements.

In various other exemplary embodiments of the double-pass optical system of this invention, the double-pass optical elements include a refractive sagittal cylindrical optical element.

In various other exemplary embodiments of the double-pass optical system of this invention, the double-pass optical elements include a refractive tangential cylindrical optical element.

In the double-pass optical system of this invention, advantages such as lower cost and ease of alignment are achieved.

These and other features and advantages of this invention are described in or are apparent from the following detailed description of the systems and methods according to this invention.

BRIEF DESCRIPTION OF THE DRAWINGS

Various exemplary embodiments of this invention will be described in detail, with reference to the following figures, wherein:

FIGS. 2(a)–2(b) show an exemplary embodiment of an imaging system incorporating a double-pass sagittally offset optical system including a hybrid toroidal diffractive optical element;

FIGS. 3(a)–3(b) show an exemplary embodiment of an imaging system incorporating a double-pass sagittally offset optical system including refractive cross-cylindrical optical elements;

FIGS. 4(a)–4(b) show an exemplary embodiment of an imaging system incorporating a double-pass sagittally offset optical system including a single refractive cross-cylindrical optical element;

FIGS. 5(a)–5(b) show an exemplary embodiment of an imaging system incorporating a double-pass sagittally offset optical system including refractive spherical and cylindrical optical elements;

DETAILED DESCRIPTION OF PREFERRED EMBODIMENTS

Imaging system optical architectures include sagittal offset and tangential offset designs. Tangential or sagittal offset refers to the orientation of a light beam incident on the polygon facet of the polygon mirror. If the incident light beam is in the plane of the polygon rotation of the polygon mirror, then the architecture is a tangentially offset design. If the incident light beam is not in the plane of the polygon rotation of the polygon mirror, the architecture is a sagittally offset design.

A sagittally offset design may apply a double-pass optical system. In the double pass sagittally offset optical system, the same beam characteristics of the light beam are provided at the facet of the polygon mirror, collimated in the tangential plane and focused in the sagittal plane. In this double-pass sagittally offset optical system, the pre-polygon scan lenses contribute power in shaping the light beam at the facet of the polygon mirror, both in the pre-polygon optical path as well as in the post-polygon optical path. Depending on the surface types of the pre-polygon scan lenses, whether the pre-polygon scan lens is cylindrical or spherical, only tangential power or both tangential and sagittal power may be contributed by the pre-polygon scan lenses.

In one exemplary embodiment of a double-pass sagittally offset optical system, to achieve the desired beam shape at a facet of the polygon mirror, an aspherical lens is used in the pre-polygon optics to collimate the light beam from the light source. A spherical lens and pre-polygon scan lenses in the pre-polygon optics expand and collimate the light beam in the tangential plane at the polygon facet. The light beam is converged after passing through the scan lens farthest from the polygon mirror in both planes of the pre-polygon scan lenses, and is collimated after passing through the scan lens closest to the polygon in the tangential plane of the pre-polygon scan lenses. A cylindrical lens in the pre-polygon optics focuses the light beam in the sagittal plane at the polygon facet. The light beam then is propagated back through the pre-polygon scan lenses before reaching the image carrying member.

Figure 1A:
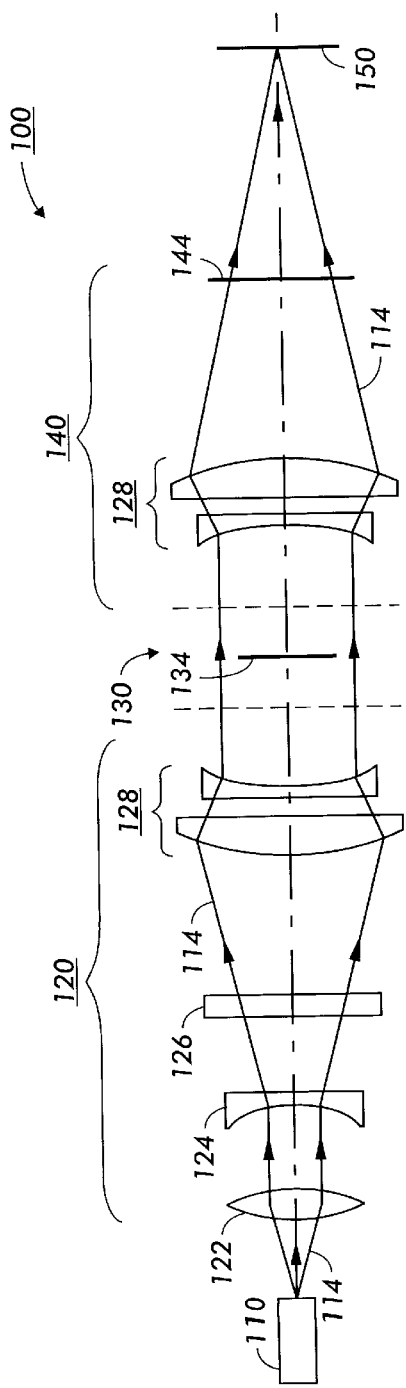
FIGS. 1(a)–(b) illustrate an exemplary embodiment of an imaging system incorporating a conventional double-pass optical system.
Figure 1B:
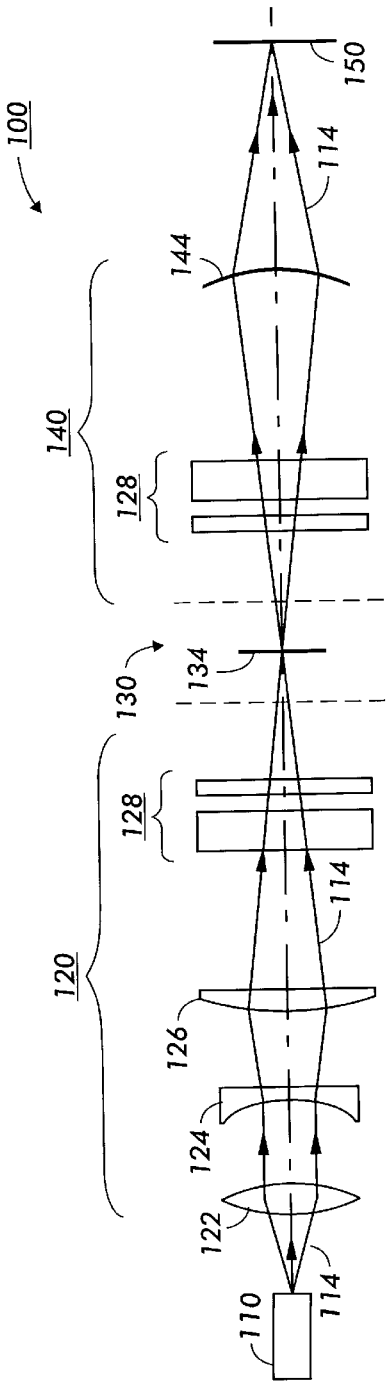

FIGS. 1(a)–(b) illustrate one exemplary embodiment of an imaging system incorporating a double-pass sagittally offset optical system. FIG. 1(a) illustrates an imaging system 100 in a tangential view while FIG. 1(b) illustrates the imaging system 100 in a sagittal view. As shown in FIGS. 1(a)–(b), the imaging system 100 includes a light source 110 that emits at least one light beam 114 to the pre-polygon optics 120. The pre-polygon optics 120 includes an aspherical optical element 122, a spherical optical element 124, a cylindrical optical element 126 and pre-polygon scan lenses 128. The light beam 114 passes first through the aspherical optical element 122, the spherical optical element 124 and then through the cylindrical optical element 126. The optical elements 122–126 act to collimate the ilght beam 114 in the fast scan direction and to converge the light beam 124 in the cross-scan direction to a line focused on the polygon facet of a rotating polygon mirror 134 of the scanning device 130.

The light beam 114 is collimated after passing through the aspherical optical element 122. The light beam 114 is divergent after passing through the spherical optical element 124. The light beam 114 is divergent after passing through the sagittal cylindrical optical element 126 in the tangential plane, and convergent after passing through the sagittal cylindrical optical element 126 in the sagittal plane. The light beam is convergent after passing through the scan lens farthest from the polygon mirror 134 in both planes of the pre-polygon scan lenses 128. The light beam is collimated after passing through the scan lens closest to the polygon 134 in the tangential plane of the pre-polygon scan lenses 128 and focused in the sagittal plane, as desired, onto a facet of the polygon mirror 134. The light beam 114 is then reflected to back through the pre-polygon scan lenses 128 and other optical elements of post-polygon optics 140.

As shown in FIGS. 1(a)–(b), the post-polygon optics 140 of the double-pass sagittally offset optical system include the pre-polygon scan lenses 128 and a cylindrical optical element 144. The scanning device 130 causes the polygon mirror 134 to rotate clockwise around an axis of rotation. The active facet of the polygon mirror 134 reflects the light beam 114 back through the scan lenses 128 and to the cylindrical optical element 144 of the post-polygon optics 140, and then to the imaging carrying member 150. As the current facet of the polygon mirror 134 scans the light beam 114 in the scan direction, the image carrying member 150 is moving in a process direction which is perpendicular to the scan direction. Each light beam 114 reflected from the current facet of the rotating polygon mirror 134 is imaged onto the image carrying member 150.

Although FIGS. 1(a)–(b) show the light source 110 as a laser diode, it should be appreciated that the imaging system of this invention is not limited to laser diodes. Any known emitting device, such as any solid state laser, gas laser, liquid laser or semiconductor laser can be used. Further, a light emitting diode, organic light emitting diode or the like can be used, so long as the emitted light beam 114 can be modulated.

The architecture of the imaging system 110 is designed such that the angles of incidence at the polygon mirror 134 in sagittal offset designs are small in order to minimize aberration in the resulting image. Further, the angles are also large enough such that interference between the incidence and the reflection of the light beam 114 off the polygon mirror 134 does not occur. Moreover, the collimated light beam 114 created by the pre-polygon optics 120 must be of a desired diameter at the facet of the polygon mirror 134 to enable the facet to be illuminated. The same characteristics of the light beam 114 collimated in the tangential plane and focused in the sagittal plane are provided at the facet of the polygon mirror 134. The pre-polygon scan lenses 128 contributes power in shaping the beam 114 at the facet. Depending on the surface type of the scan lenses 128, whether the scan lens 128 is cylindrical or spherical, only tangential power, or both tangential power and sagittal power, may be contributed by the scan lenses 128. This contributed power is set for the pre-polygon optics 120.

In various exemplary embodiments of the systems and methods of this invention, the number of pre-polygon elements in the pre-polygon optics 120 are reduced while achieving the same desired light beam characteristic at the facet of the polygon mirror 134 as the system shown in FIGS. 1(a)–(b). Thus, advantages such as lower cost and ease of alignment are achieved.

FIGS. 2(a)–(b) show one exemplary embodiment of a double-pass sagittally offset optical system of this invention. FIG. 2(a) illustrates an imaging system 200 incorporating a double-pass sagittally offset optical system in a tangential view, while FIG. 2(b) illustrates the imaging system 200 in a sagittal view. Similar elements having similar functions as shown in the imaging system 100 of FIGS. 1(a)–(b) are labeled using the same numbers and their descriptions are redundant, and therefore omitted.

As shown in FIGS. 2(a)–(b), the pre-polygon optics 120 may include a hybrid toroidal diffractive optical element 121. In this embodiment, the aspherical optical element 122, the spherical optical element 124, and the cylindrical optical element 126, as shown in the system of FIGS. 1(a)–(b) are omitted in favor of the hybrid toroidal diffractive optical element 121. The hybrid toroidal diffractive optical element 121 collects the divergent light beam 114 from the light source 110 and shapes the light beam 114 differently in the tangential and sagittal planes. The hybrid toroidal diffractive optical element 121 adds a desired amount of power in the tangential plane so that when combined with the pre-polygon scan lenses 128, a collimated light beam 114 of the required width is produced at the facet of the polygon mirror 134. The hybrid toroidal diffractive optical element 121 adds the desired amount of power in the sagittal plane so that when combined with the pre-polygon scan lenses 128, a sagittally focused light beam 114 is produced at the facet of the polygon mirror 134.

The hybrid toroidal diffractive optical element 121 may have refractive as well as diffractive power. The powers required by the hybrid toroidal diffractive optical element are different between the tangential and sagittal planes.

It should be appreciated that, though FIGS. 2(a)–(b) shows the optical element 121 as a hybrid toroidal diffractive optical element, any optical element that achieves the same function as the hybrid toroidal diffractive optical element may be used. For example, it should be appreciated that refractive toroidal optical elements may be provided.

FIGS. 3(a)–(b) show another exemplary embodiment of a double-pass sagittally offset optical system of this invention. FIG. 3(a) illustrates an imaging system 300 incorporating a double-pass sagittally offset optical system in a tangential view, while FIG. 3(b) illustrates the imaging system 300 in a sagittal view. Similar elements having similar functions as shown in the imaging system 100 of FIGS. 1(a)–(b) are labeled using the same numbers and their descriptions are redundant, and therefore omitted.

As shown in FIGS. 3(a)–(b), the pre-polygon optics 120 may include refractive cross-cylindrical optical elements 123. In this embodiment, the aspherical optical element 122, the spherical optical element 124, and the cylindrical optical element 126, as shown in the system of FIGS. 1(a)–(b) are omitted in favor of the refractive cross-cylindrical optical elements 123. As shown in FIGS. 3(a)–(b), the cross-cylindrical optical elements 123 include a refractive sagittal cylindrical optical element 123a and a refractive tangential cylindrical optical element 123b. These optical elements are used in the pre-polygon optics 120 to achieve the desired beam characteristics at a facet of the polygon mirror 134. The power in the refractive tangential cylindrical element 123b is chosen such that, when combined with the power of the scan lenses 128, the light beam 114 is collimated and of the required width at the facet. Similarly, the power in the refractive sagittal cylindrical 123a is chosen such that, when combined with the power of the scan lenses 128, the light beam 114 is focused at the facet of the polygon mirror 134.

It should be appreciated that though FIGS. 3(a)–(b) show the cross-cylindrical optical elements 123 as refractive cylindrical optical elements, cross-cylindrical diffractive optical elements may be applied to achieve the same function as the refractive cross-cylindrical optical elements.

FIGS. 4(a)–(b) show another exemplary embodiment of a double-pass sagittally offset optical system of this invention. FIG. 4(a) illustrates an imaging system 400 incorporating a double-pass sagittally offset pre-polygon optical system in a tangential view, while FIG. 4(b) illustrates the imaging system 400 in a sagittal view. Similar elements having similar functions as shown in the imaging system 300 of FIGS. 3(a)–(b) are labeled using the same numbers and their descriptions are redundant, and therefore omitted.

As shown in FIGS. 4(a)–(b), the pre-polygon optics 120 may include a single refractive cross-cylindrical optical element 123. In this embodiment, the cross-cylindrical surfaces of the refractive cross-cylindrical optical elements 123a and 123b, as shown in the system of FIGS. 3(a)–(b), are omitted in favor of the single refractive cross-cylindrical optical element 123. As shown in FIGS. 4(a)–(b), the cross-cylindrical optical element 123 includes one surface that is a sagittal cylindrical optical element and the other surface that is a tangential cylindrical optical element. This cross-cylindrical optical element 123 is used in the pre-polygon optics 120 to achieve the desired beam characteristics at a facet of the polygon mirror 134.

FIGS. 5(a)–(b) show another exemplary embodiment of a double-pass sagittally offset optical system of this invention. FIG. 5(a) illustrates an imaging system 500 incorporating a double-pass sagittally offset pre-polygon optical system in a tangential view, while FIG. 5(b) illustrates the imaging system 500 in a sagittal view. Similar elements having similar functions as shown in the imaging system 100 of FIGS 1(a)–(b) are labeled using the same numbers and their descriptions are redundant, and therefore omitted.

As shown in FIGS. 5(a)–(b), the pre-polygon optics 120 may include a refractive spherical optical element 125a and a refractive sagittal cylindrical optical element 125b. In this embodiment, the aspherical optical element 122, the spherical optical element 124, and the cylindrical optical element 126, as shown in the system of FIGS. 1(a)–(b) are omitted in favor of the refractive spherical optical element 125a and the refractive sagittal cylindrical optical element 125b. In this embodiment, the refractive spherical optical element 125a is used to gather the divergent light beam 114 from the light source 110 and to make the light beam 114 diverge at a desired angle such that, when combined with the power of the scan lenses 128, the light beam 114 is collimated and of the required width at the facet of the polygon mirror 134. The refractive sagittal cylindrical optical element 125b is additionally used to focus the light beam 114 at the facet of the polygon mirror 134.

It should be appreciated that though FIGS. 5(a)–(b) show the spherical and cylindrical optical elements 125a and 125b as refractive spherical and cylindrical elements, spherical and cylindrical diffractive optical elements, or one of the spherical and cylindrical elements being a diffractive optical element and the other being a refractive optical element, may be used to achieve the same function as the refractive spherical and cylindrical optical elements discussed above.

Figure 6A:
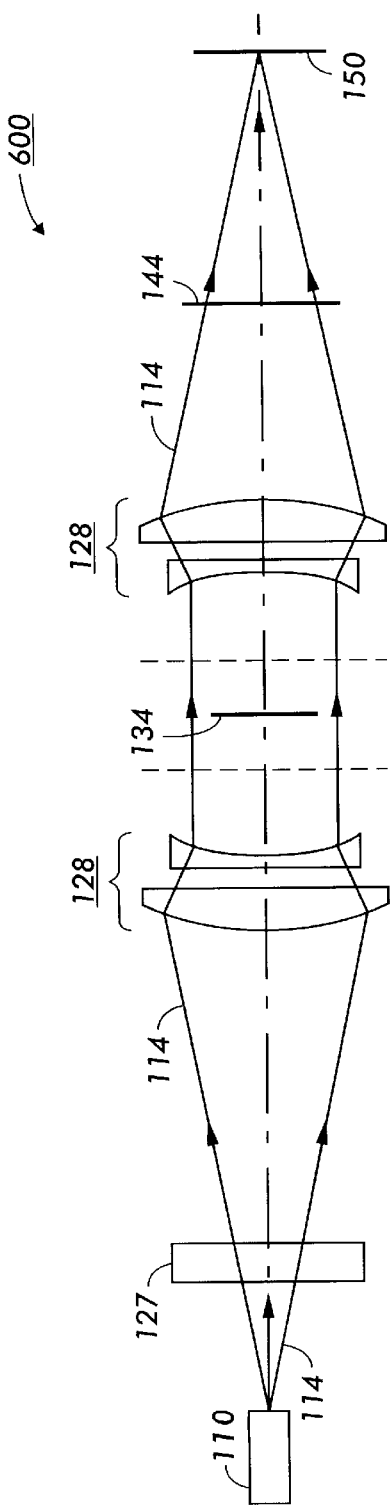
FIGS. 6(a)–6(b) show an exemplary embodiment of an imaging system incorporating a double-pass sagittally offset optical system including a refractive sagittal cylindrical optical element.
Figure 6B:
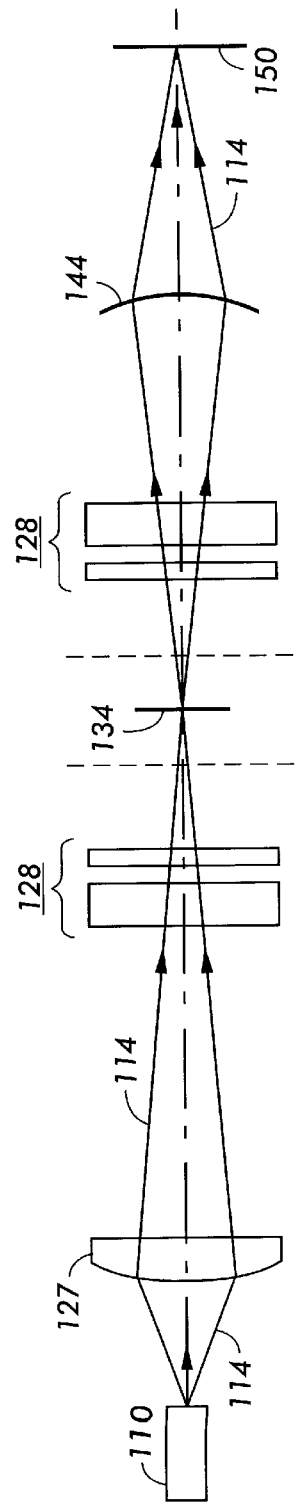

FIGS. 6(a)–(b) show another exemplary embodiment of a double-pass sagittally offset optical system of this invention. FIG. 6(a) illustrates an imaging system 600 incorporating a double-pass sagittally offset optical system in a tangential view, while FIG. 6(b) illustrates the imaging system 600 in a sagittal view. Similar elements having similar functions as shown in the imaging system 100 of FIGS. 1(a)–(b) are labeled using the same numbers and their descriptions are redundant, and therefore omitted.

As shown in FIGS. 6(a)–(b), the pre-polygon optics 120 may include a refractive sagittal cylindrical optical element 127. In this embodiment, the aspherical optical element 122, the spherical optical element 124, and the cylindrical optical element 126, as shown in the system of FIGS. 1(a)–(b) are omitted in favor of the refractive sagittal cylindrical optical element 127. In this embodiment, the light source 110 is placed at the tangential back focal point of the scan lenses 128, producing collimated light in the tangential plane at the of the polygon mirror 134. As shown in FIGS. 6(a)–(b), a sagittal cylindrical optical element 127 is used to focus the light beam 114 at the facet of the polygon mirror 134 in the sagittal plane. It should be appreciated that though FIGS. 6(a)–(b) show the cylindrical optical element 127 as a refractive cylindrical element, a diffractive cylindrical element can be used.

Figure 7:
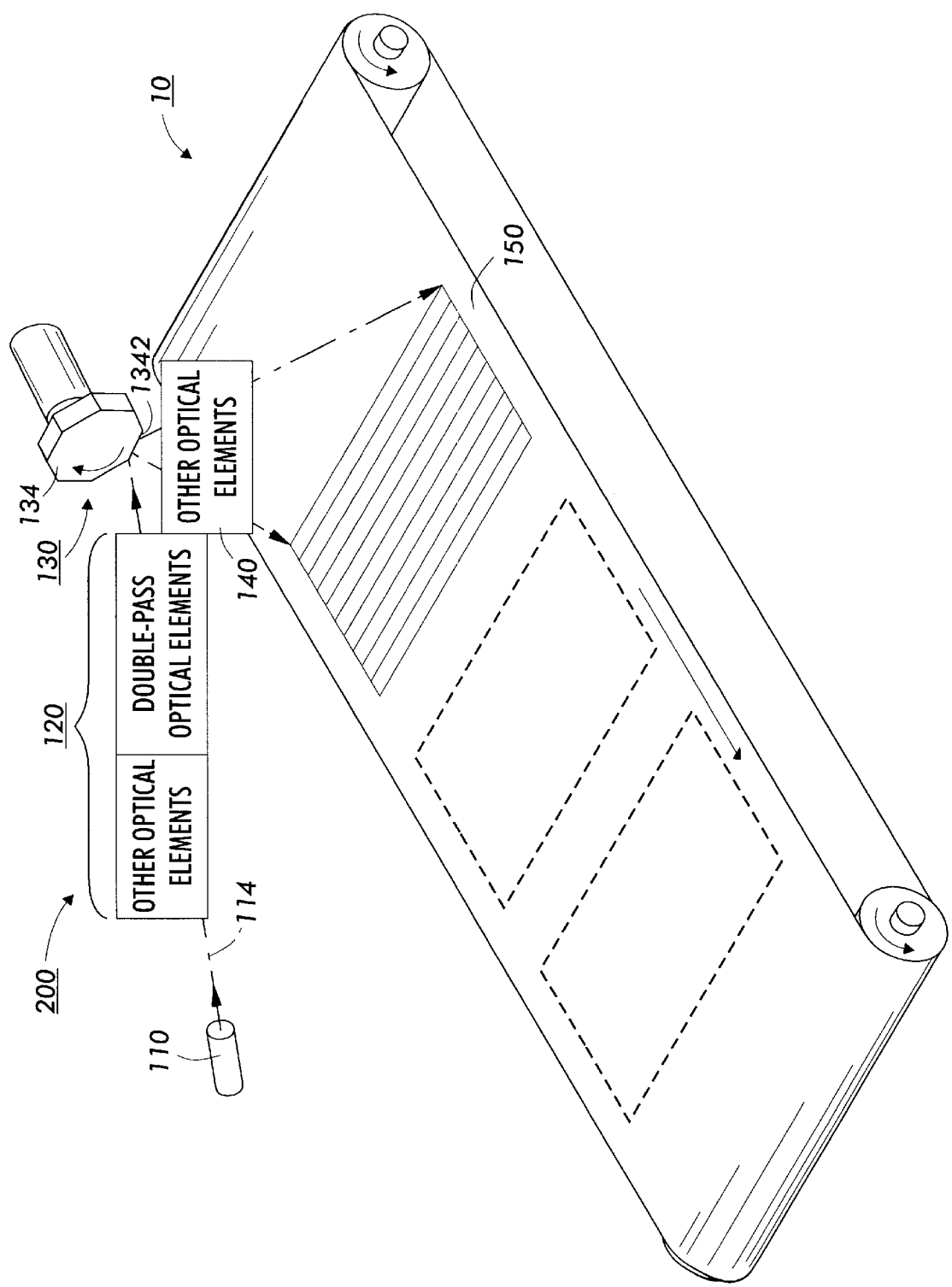
FIG. 7 illustrates one exemplary embodiment of an image output device incorporating the imaging system of this invention.

FIG. 7 illustrates one exemplary embodiment of an image output device 10 incorporating the imaging system of this invention. As shown in FIG. 7, in the image output device 10, during the operation of the imaging system 200, the light source 110 emits at least one light beam 114 which passes first through the other, non-double pass optical elements, and then through the double-pass optical elements of the pre-polygon optics 120. The pre-polygon optics 120 collimates the light beam 114 in the fast scan direction and converges the light beam 114 in the cross-scan direction to a line focus on a polygon facet 1342 of the rotating polygon mirror 134. The rotating polygon mirror 134 in the scanning device 130 rotates around an axis of rotation, while the current facet 1342 of the polygon mirror 134 reflects the light beam 114 back through the double-pass optical elements and through the other optical elements of the post-polygon optics 140. As the current facet 1342 scans the light beam 114 in the scan direction, an image carrying member 150 in an image output device 10 moves in a process direction that is perpendicular to the scan direction. Each light beam 114 reflected from the current facet 1342 of the rotating polygon mirror 134 is reflected back through the double-pass optical elements and other optical elements of the post-polygon optics 140, and is imaged onto the image carrying member 150.

While FIG. 7 shows the image carrying member 150 as a photoreceptor belt, it should be appreciated that the raster output scanner of this invention may be used with a belt, drum, or any other known or later developed photoreceptor. In general, any photoreceptor device which is capable of receiving image light beams representing the original image data can be used as the image carrying member 150.

Furthermore, it should be appreciated that the raster output scanner of this invention can be implemented in any one of a number of different image forming devices, such as a copier, printer, facsimile device, or the like.

While this invention has been described in conjunction with the exemplary embodiments outlined above, it is evident that many alternatives, modifications and variations will be apparent to those skilled in the art. Accordingly, the exemplary embodiments of the invention may be made without departing from the spirit and scope of the invention.

What is claimed is:

1. A double-pass imaging system comprising:
   a light source that emits at least one light beam;
   pre-polygon optics comprising a pre-polygon optical element and pre-polygon scan lenses, the light source emitting the at least one light beam to the pre-polygon optics, and the pre-polygon optical element consisting of no more than two optical elements which converge the at least one light beam; and
   a polygon mirror, the pre-polygon optics collimating and converging the at least one light beam onto the polygon mirror, and the polygon mirror reflecting the at least one light beam back through the pre-polygon scan lenses.

2. The double-pass imaging system of claim 1, wherein the pre-polygon optical element comprises a hybrid toroidal optical element.

3. The double-pass imaging system of claim 2, wherein the hybrid toroidal optical element is a diffractive optical element.

4. The double-pass imaging system of claim 2, wherein the hybrid toroidal optical element is a refractive optical element.

5. The double-pass imaging system of claim 1, wherein the pre-polygon optical element comprises a cross-cylindrical optical element.

6. The double-pass imaging system of claim 5, wherein the cross-cylindrical optical element is a diffractive optical element.

7. The double-pass imaging system of claim 5, wherein the cross-cylindrical optical element is a refractive optical element.

8. The double-pass imaging system of claim 5, wherein the cross-cylindrical optical element comprises a sagittal cylindrical optical element.

9. The double-pass imaging system of claim 8, wherein the cross-cylindrical optical element further comprises a tangential cylindrical optical element.

10. The double-pass imaging system of claim 5, wherein the cross-cylindrical optical element comprises a single optical element having a sagittal cylindrical surface and a tangential cylindrical surface.

11. The double-pass imaging system of claim 1, wherein the pre-polygon optical element comprises a spherical optical element.

12. The double-pass imaging system of claim 11, wherein the pre-polygon optical element further comprises a sagittal cylindrical optical element.

13. The double-pass imaging system of claim 12, wherein the spherical optical element is a refractive optical element.

14. The double-pass imaging system of claim 12, wherein the spherical optical element is a diffractive optical element.

15. The double-pass imaging system of claim 12, wherein the sagittal cylindrical optical element is a refractive optical element.

16. The double-pass imaging system of claim 12, wherein the sagittal cylindrical optical element is a diffractive optical element.

17. The double-pass imaging system of claim 1, wherein the pre-polygon optical element comprises a sagittal cylindrical optical element.

18. The double-pass imaging system of claim 17, wherein the sagittal cylindrical optical element is a diffractive optical element.

19. The double-pass imaging system of claim 17, wherein the sagittal cylindrical optical element is a refractive optical element.

20. A double pass optical system comprising:
    a light source that emits one light beam;
    pre-polygon optics comprising a pre-polygon optical element and pre-polygon scan lenses, the light source emitting the at least one light beam to the pre-polygon optics, and the pre-polygon optical element consisting of no more than two optical elements which converge the at least one light beam; and
    a polygon mirror, the pre-polygon optics collimating and converging the at least one light beam onto the polygon mirror, and the polygon mirror reflecting the at least one light beam back through the pre-polygon scan lenses.

* * * * *